(12) United States Patent
Ahn et al.

(10) Patent No.: US 9,400,578 B2
(45) Date of Patent: Jul. 26, 2016

(54) TOUCH PANEL, TOUCH SCREEN APPARATUS, AND METHOD OF DRIVING THE TOUCH PANEL

(71) Applicant: Samsung Electronics Co., Ltd., Suwon-Si, Gyeonggi-Do (KR)

(72) Inventors: Seung-eon Ahn, Hwaseong-si (KR); I-hun Song, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 512 days.

(21) Appl. No.: 13/747,775

(22) Filed: Jan. 23, 2013

(65) Prior Publication Data

US 2014/0028612 A1 Jan. 30, 2014

(30) Foreign Application Priority Data

Jul. 25, 2012 (KR) ........................ 10-2012-0081438

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2002/0163492 A1 | 11/2002 | Senda | |
| 2006/0017710 A1 | 1/2006 | Lee et al. | |
| 2008/0062148 A1* | 3/2008 | Hotelling ............ | G02F 1/13338 345/174 |
| 2009/0273578 A1 | 11/2009 | Kanda et al. | |
| 2010/0079406 A1 | 4/2010 | Chen et al. | |
| 2010/0144391 A1* | 6/2010 | Chang ................. | G02F 1/13338 455/566 |
| 2010/0182273 A1 | 7/2010 | Noguchi et al. | |
| 2010/0194707 A1* | 8/2010 | Hotelling et al. ............. 345/173 | |
| 2010/0214203 A1 | 8/2010 | Lee et al. | |
| 2010/0225609 A1* | 9/2010 | Huang et al. ................... 345/173 | |
| 2010/0328257 A1* | 12/2010 | Noguchi et al. .............. 345/174 | |
| 2011/0090416 A1 | 4/2011 | Arasawa et al. | |
| 2012/0062508 A1 | 3/2012 | Liu et al. | |
| 2012/0086656 A1* | 4/2012 | Hung et al. .................... 345/173 | |
| 2012/0169630 A1 | 7/2012 | Chou et al. | |
| 2012/0319992 A1 | 12/2012 | Lee | |
| 2013/0063404 A1* | 3/2013 | Jamshidi Roudbari ................ | G06F 3/044 345/204 |
| 2014/0146013 A1 | 5/2014 | Noguchi et al. | |
| 2014/0292718 A1 | 10/2014 | Noguchi et al. | |

FOREIGN PATENT DOCUMENTS

| | | |
|---|---|---|
| EP | 1249823 A2 | 10/2002 |
| EP | 2515210 A2 | 10/2012 |
| EP | 2894512 A1 | 7/2015 |
| KR | 1020040002311 A | 1/2004 |
| KR | 1020070000042 A | 1/2007 |
| KR | 1020100080469 A | 7/2010 |
| KR | 1020110073199 A | 6/2011 |
| KR | 101085086 B1 | 11/2011 |
| KR | 1020120006176 A | 1/2012 |
| KR | 1020120017587 A | 2/2012 |
| KR | 1020120040037 A | 4/2012 |
| KR | 1020130104290 A | 9/2013 |
| WO | WO-2011/074911 A2 | 6/2011 |

OTHER PUBLICATIONS

Extended European Search Report dated Aug. 11, 2015 for corresponding EP Application No. 13162359.7.

* cited by examiner

*Primary Examiner* — Christopher R Lamb
(74) *Attorney, Agent, or Firm* — Harness, Dickey & Pierce (57) ABSTRACT

A touch panel configured to drive a liquid crystal according to a voltage difference between first and second electrodes. The touch panel includes at least one display unit configured to generate an image voltage and apply the image voltage to the first electrode. The image voltage corresponds to image data to be displayed in response to activation of a display gate line. The touch panel further includes at least one sensing unit configured to sense, in response to activation of a sensor gate line, a voltage variation of the second electrode to determine whether a finger capacitance is generated by a physical touch on the touch panel.

19 Claims, 11 Drawing Sheets

FIG. 14

TOUCH PANEL, TOUCH SCREEN APPARATUS, AND METHOD OF DRIVING THE TOUCH PANEL

CROSS-REFERENCE TO RELATED APPLICATIONS

This application claims the benefit of Korean Patent Application No. 10-2012-0081438, filed on Jul. 25, 2012, in the Korean Intellectual Property Office, the disclosure of which is incorporated herein in its entirety by reference.

BACKGROUND

1. Field

At least one example embodiment relates to touch panels, touch screen apparatuses, and/or methods of driving the same, and more particularly, to touch panels and/or touch screen apparatuses with improved sensing accuracy, and/or methods of adaptively driving the touch panels.

2. Description of the Related Art

As demand for high-performance and miniature touch panels increases, touch panels have become highly integrated, and their design rules have been decreased. Thus, touch panels and touch screen apparatuses with improved sensing accuracy and methods of adaptively driving the touch panels are desired.

SUMMARY

Provided are touch panels and/or touch screen apparatuses with improved sensing accuracy and methods of adaptively driving the touch panels.

Additional aspects will be set forth in part in the description which follows and, in part, will be apparent from the description, or may be learned by practice of the example embodiments.

According to at least one example embodiment, a touch panel that drives a liquid crystal according to a voltage difference between first and second electrodes includes at least one display unit configured to generate an image voltage and apply the image voltage to the first electrode. The image voltage corresponds to image data to be displayed in response to activation of a display gate line. The touch panel further includes at least one sensing unit configured to sense, in response to activation of a sensor gate line, a voltage variation of the second electrode to determine whether a finger capacitance is generated by a physical touch on the touch panel.

According to at least one example embodiment, the first electrode is a pixel electrode, and the second electrode is a common electrode.

According to at least one example embodiment, the at least one display unit is a plurality of display units, and the second electrode is shared by a pair of display units from among the plurality of display units.

According to at least one example embodiment, the at least one display unit is a plurality of display units and the at least one sensing unit is a plurality of sensing units, and each of the sensing units is disposed in a corresponding one of the display units.

According to at least one example embodiment, the first and second electrodes are substantially parallel to an orientation of a director axis of the liquid crystal.

According to at least one example embodiment, the voltage variation of the second electrode corresponds to a ratio of a coupling capacitance between the second electrode and the sensor gate line with respect to the finger capacitance.

According to at least one example embodiment, the at least one display unit and the at least one sensing unit are formed on a same array.

According to at least one example embodiment, the at least one sensing unit includes a sensing transistor configured to generate a sensing current corresponding to the voltage variation of the second electrode. The sensing transistor has a gate connected to the second electrode. The sensing unit includes a selection transistor configured to supply the sensing current of the sensing transistor to a sensing line if the sensor gate line is activated. The selection transistor has an end connected to an end of the sensing transistor and a gate connected to the sensor gate line. The sensing unit includes at least one reset transistor configured to reset the second electrode if the display gate line is activated and the sensor gate line is deactivated. The at least one reset transistor has a gate connected to the display gate line, an end connected to the second electrode, and an other end connected to the sensor gate line.

According to at least one example embodiment, the sensing current of the sensing transistor corresponds to a ratio of a coupling capacitance between the first electrode and the sensor gate line with respect to the finger capacitance.

According to at least one example embodiment, an other end of the sensing transistor is connected to the sensor gate line.

According to at least one example embodiment, the at least one display unit is a plurality of display units, and the at least one sensing unit is disposed between two adjacent display units from among the plurality of display units.

According to at least one example embodiment, the at least one reset transistor includes a first reset transistor having a gate connected to a display gate line of one of the two adjacent display units, and a second reset transistor having a gate connected to a display gate line of the other of the two adjacent display units.

According to at least one example embodiment, further including a display resetting unit configured to reset the second electrode if the display gate line is activated after the at least one sensing unit performs sensing.

According to at least one example embodiment, while the sensor gate line is activated, the first electrode floats so that a voltage difference between the first and second electrodes used in driving the liquid crystal is maintained.

According to at least one example embodiment, the first electrode and the second electrode are adjacent to one another and in a same plane.

According to at least one example embodiment, the director axis of the liquid crystal is substantially parallel to a touching surface of the touch panel.

According to at least one example embodiment, a touch screen apparatus includes a touch panel configured to drive a liquid crystal according to a voltage difference between first and second electrodes. The touch panel includes a display unit configured to generate an image voltage and apply the image voltage to the first electrode. The image voltage corresponds to image data to be displayed in response to activation of a display gate line. The touch panel includes a sensing unit configured to sense, in response to activation of a sensor gate line, a voltage variation of the second electrode to determine whether a finger capacitance is generated by a physical touch on the touch panel. The touch screen apparatus further includes a gate driver configured to apply a gate voltage to the display gate line and the sensor gate line of the touch panel. The touch screen apparatus further includes a signal output unit configured to output a signal corresponding to a received sensing value of the sensing unit of the touch panel.

According to at least one example embodiment, the first electrode is a pixel electrode, and the second electrode is a common electrode.

According to at least one example embodiment, the first and second electrodes are substantially parallel to an orientation of a director axis of the liquid crystal.

According to at least one example embodiment, the sensing unit includes a sensing transistor configured to generate a sensing current corresponding to the voltage variation of the second electrode. The sensing transistor has a gate connected to the second electrode. The sensing unit further includes a selection transistor configured to supply the sensing current of the sensing transistor to a sensing line if the sensor gate line is activated. The selection transistor has an end connected to an end of the sensing transistor and a gate connected to the sensor gate line. The sensing unit further includes a reset transistor configured to reset the second electrode if the display gate line is activated and the sensor gate line is deactivated. The reset transistor has a gate connected to the display gate line, an end connected to the second electrode, and another end connected to the sensor gate line.

According to at least one example embodiment, a method of driving a touch panel whereby a liquid crystal is driven according to a voltage difference between first and second electrodes includes generating an image voltage to be displayed in response to activation of a first display gate line. The method further includes applying the image voltage to the first electrode. The method further includes sensing, in response to activation of a sensor gate line, a voltage variation of the second electrode to determine whether a finger capacitance is generated by a physical touch on the touch panel.

According to at least one example embodiment, after the sensing, the method further includes resetting the second electrode in response to activation of a second display gate line.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF EXAMPLE EMBODIMENTS

Example embodiments will be understood more readily by reference to the following detailed description and the accompanying drawings. The example embodiments may, however, be embodied in many different forms and should not be construed as being limited to those set forth herein. Rather, these example embodiments are provided so that this disclosure will be thorough and complete. In at least some example embodiments, well-known device structures and well-known technologies will not be specifically described in order to avoid ambiguous interpretation.

It will be understood that when an element is referred to as being "connected to" or "coupled to" another element, it can be directly on, connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the example embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including" when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below", "beneath", "lower", "above", "upper", and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
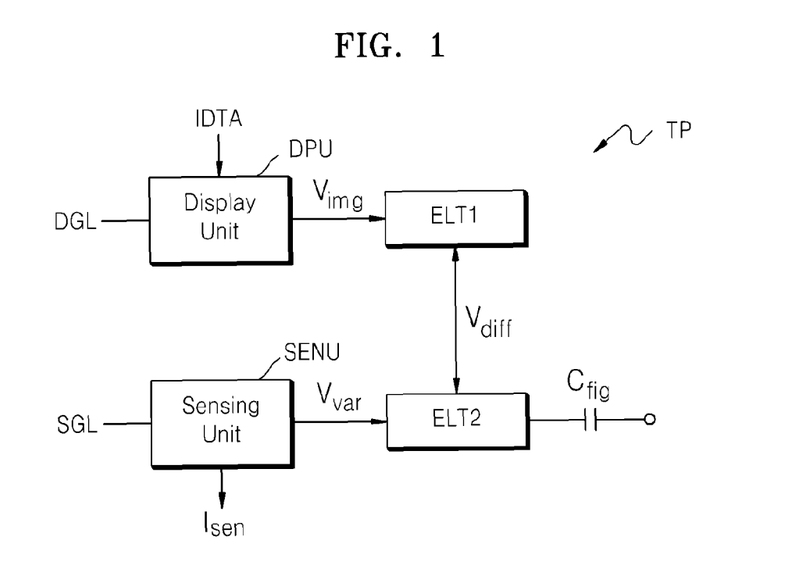
FIG. 1 is a conceptual view of a touch panel according to at least one example embodiment.

FIG. 1 is a conceptual view of a touch panel TP according to at least one example embodiment.

Referring to FIG. 1, the touch panel TP according to at least one example embodiment includes a display unit DPU and a sensing unit SENU. The display unit DPU applies an image voltage $V_{img}$ to a first electrode ELT1 in response to activation of a display gate line DGL and drives a liquid crystal according to a voltage difference $V_{diff}$ between the first electrode ELT1 and a second electrode ELT2. Charges corresponding to the voltage difference $V_{diff}$ between the first electrode ELT1 and the second electrode ELT2 are charged in a storage capacitor of the display unit DPU that will be described below.

The first electrode ELT1 may be a pixel electrode, and the second electrode ELT2 may be a common electrode. As will be described below, each pixel of the display unit DPU may include a transistor (not shown) that is turned on in response to activation of the display gate line DGL and applies the image voltage Vimg to the first electrode ELT1. The image voltage $V_{img}$ is a voltage corresponding to image data IDTA applied to a source line (not shown) to which one end of a transistor is connected, so as to display the image data IDTA.

A common voltage (or a reference voltage) may be applied to the second electrode ELT2. A twisting degree of the liquid crystal varies according to the voltage difference $V_{diff}$ between the first electrode ELT1 and the second electrode ELT2, and a transmission degree of a backlight varies according to a twist difference in the liquid crystal. Thus, the display unit DPU of the touch panel TP may display the image data IDTA.

The sensing unit SENU senses whether a finger capacitance $C_{fig}$ is generated by a physical touch on the touch panel TP. The sensing unit SENU may sense the finger capacitance $C_{fig}$ from a voltage variation of the second electrode ELT2 in response to activation of a sensor gate line SGL. The finger capacitance $C_{fig}$ is a parasitic capacitance that is formed by a voltage difference between a finger that is a conductor and the second electrode ELT2 due to the physical touch. A value sensed by the sensing unit SENU is output to a sensing line SLIN (see FIG. 5) as a sensing current $I_{sen}$. Details of a structure and an operation of the sensing unit SENU will be described below.

Figure 2A:
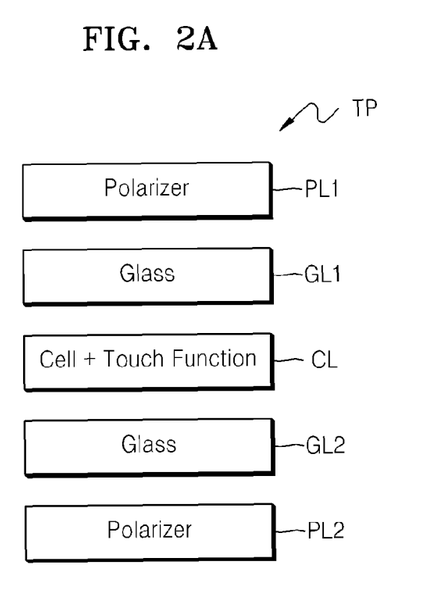
FIGS. 2A and 2B are views of types of the touch panel illustrated in FIG. 1.
Figure 2B:
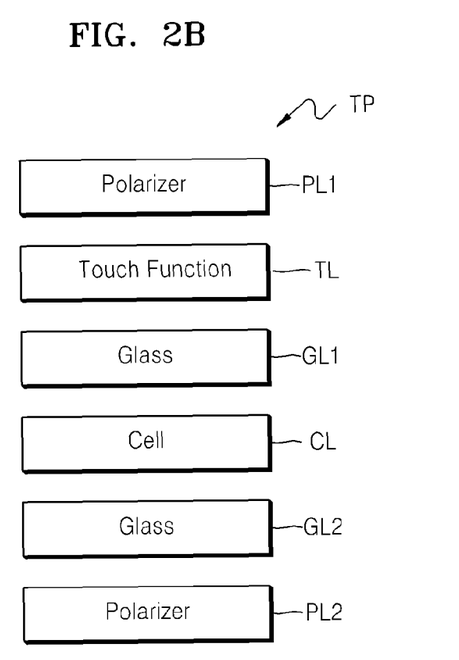

FIGS. 2A and 2B are views of example types of the touch panel TP illustrated in FIG. 1.

Referring to FIGS. 1 and 2A, the touch panel TP according to at least one example embodiment may include the display unit DPU (pixel) and the sensing unit SENU for sensing touch (touch function), which are disposed on the same cell CL between glasses GL1 and GL2 between polarizers PL1 and PL2. This type, in which a pixel for display and a circuit for sensing are disposed on the same layer (or array), may be referred to as an in-cell type. The in-cell type touch panel TP is shown in FIG. 2A. Thus, production cost may be reduced, and a process of manufacturing the touch panel TP may be simplified compared to a case where a touch pad TL (sensing unit SENU) is disposed separately from display pixels (display unit DPU), as shown in FIG. 2B. Furthermore, the touch panel TP according to at least one example embodiment is implemented as an in-cell type, and thus, the thickness of the touch panel TP may be reduced.

FIG. 2B illustrates an example in which the touch pad TL performing a touch function is disposed between an upper polarizer PL1 and an upper glass GL1. The type as shown in FIG. 2B may be referred to as an on-cell type.

When the touch panel TP according to at least one example embodiment includes the display unit DPU and the sensing unit SENU that are disposed on the same layer, as in the in-cell type, an aperture ratio may be decreased due to the sensing unit SENU. For example, the touch panel TP according to the may be implemented as an in-cell type in which first and second electrodes are disposed as shown in FIG. 3 so as to mitigate (or alternatively, minimize) a reduction in the aperture ratio.

Figure 3A:
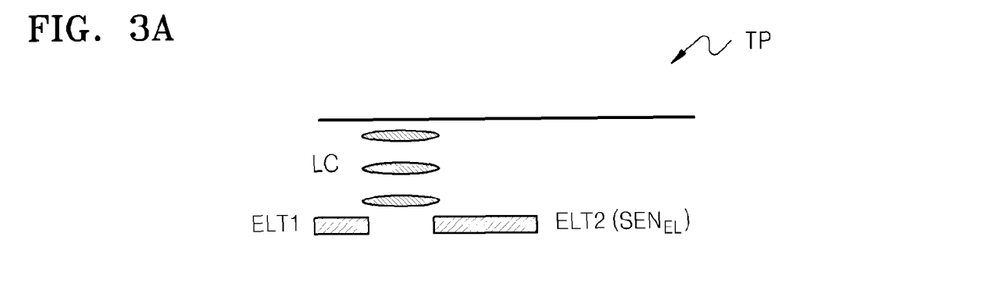
FIGS. 3A and 3B illustrate positions of first and second electrodes of the touch panel of FIG. 1, according to at least one example embodiment.
Figure 3B:
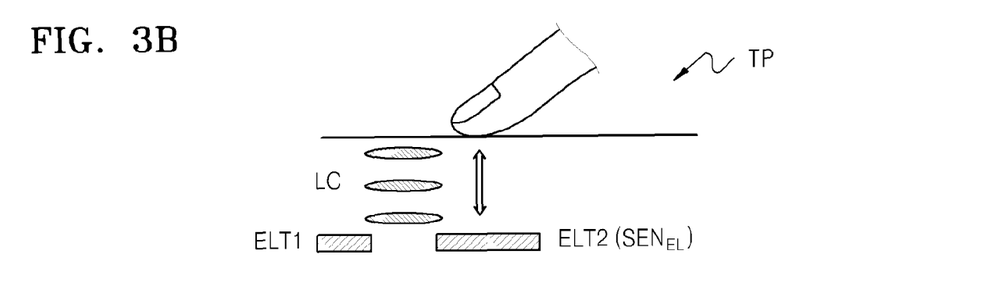

FIGS. 3A and 3B illustrate positions of first and second electrodes of the touch panel TP of FIG. 1, according to at least one example embodiment.

Referring to FIG. 1 and FIG. 3A, the first electrode ELT1 and the second electrode ELT2 of the touch panel TP may be formed in a first direction of a liquid crystal LC (i.e., the first and second electrodes ELT1 and ELT2 are substantially parallel to an orientation of a director axis of the liquid crystal molecules, and the director axis of the liquid crystal may be substantially parallel to a touching surface of the touch panel TP). For example, the first electrode ELT1 and the second electrode ELT2 may be formed adjacent to one another and in a same plane (e.g., a horizontal plane). As described above, the touch panel TP may use the second electrode ELT2 as a sensing electrode $SEN_{EL}$ for determining whether a touch is performed on the touch panel TP (see FIG. 3B). In this case, a reduction in the aperture ratio may be mitigated (or alternatively, prevented).

Figure 4A:
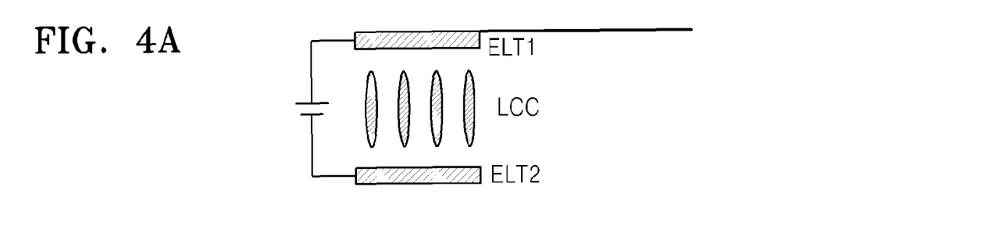
FIGS. 4A and 4B illustrate first and second electrodes of related art touch panels.
Figure 4B:
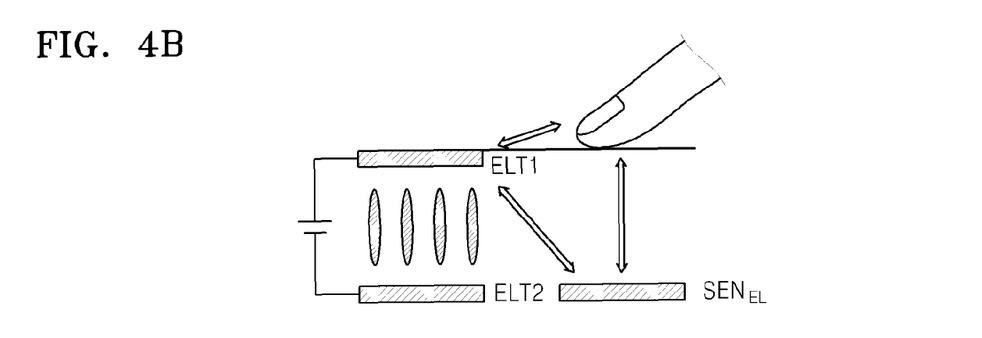

FIGS. 4A and 4B illustrate first and second electrodes of related art touch panels.

As illustrated in related art FIGS. 4A and 4B, when the first electrode ELT1 and the second electrode ELT2 are disposed in first and second directions of the liquid crystal LC, the aperture ratio may be reduced because the area of the sensing electrode $SEN_{EL}$ is to be increased due to an interference effect caused between the first electrode ELT1 and the second electrode ELT2 and the sensing electrode $SEN_{EL}$ The touch panel TP may be driven by a plane line switching (PLS) method that may obtain a wide viewing angle when including the first electrode ELT1 and the second electrode ELT2 in the structure of FIG. 3. However, example embodiments are not limited thereto. For example, the touch panel TP may be implemented with a panel that is driven by an in plane switching (IPS) method.

Hereinafter, a structure and an operation of the sensing unit SENU of the touch panel TP of FIG. 1 for performing accurate sensing will be described.

Figure 5:
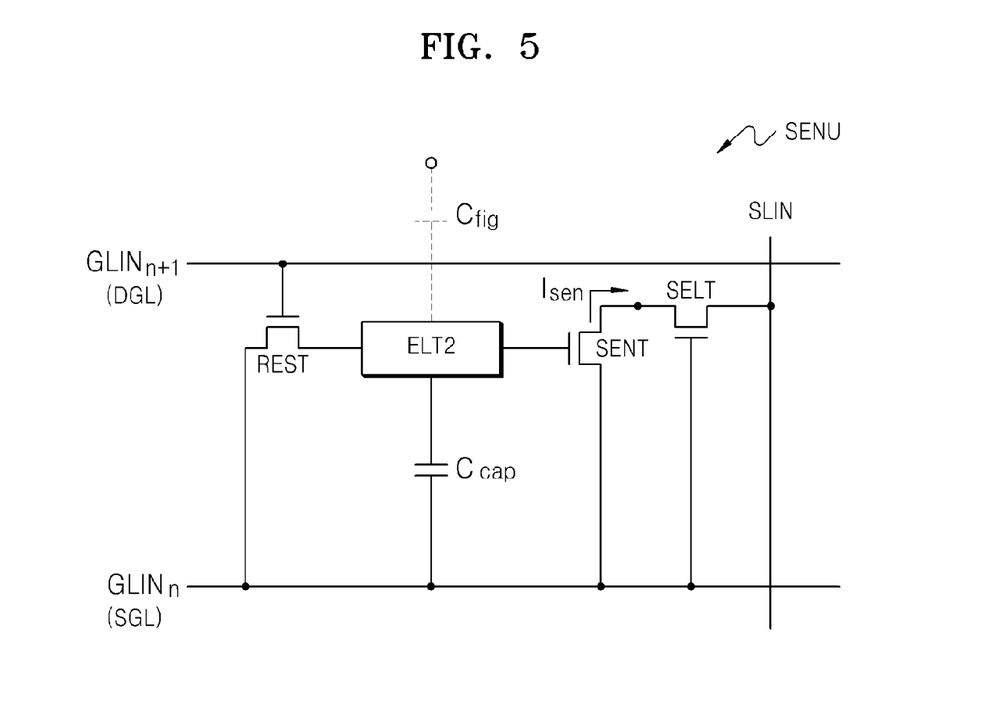
FIG. 5 is an equivalent circuit diagram of a sensing unit of the touch panel of FIG. 1, according to at least one example embodiment.

FIG. 5 is an equivalent circuit diagram of the sensing unit SENU of the touch panel TP of FIG. 1, according to at least one example embodiment;

Referring to FIGS. 1 and 5, the sensing unit SENU may include a sensing transistor SENT, a selection transistor SELT, and a reset transistor REST. A gate of the sensing transistor SENT is connected to the second electrode ELT2, and an end of the sensing transistor SENT is connected to an end of the selection transistor SELT. A gate of the selection transistor SELT is connected to a gate line $GLIN_n$, an end of the selection transistor SELT is connected to an end of the sensing transistor SENT, and the other end of the selection transistor SELT is connected to a sensing line SLIN. A gate of the reset transistor REST is connected to a gate line $GLIN_{n+1}$, an end of the reset transistor REST is connected to the second electrode ELT2, and the other end of the reset transistor REST is connected to a gate line $GLIN_n$.

As described above, the second electrode ELT2 may be a common electrode. The gate line $GLIN_n$ may be the sensor gate line SGL of FIG. 1, and the gate line $GLIN_{n+1}$ may be the display gate line DGL of FIG. 1. Thus, the selection transistor SELT is gated by activation of the sensor gate line SGL and supplies a sensing current $I_{sen}$ that is generated by the sensing transistor SENT and corresponds to a voltage variation $V_{var}$ between the second electrode ELT2 and the sensing line SLIN.

The voltage variation $V_{var}$ of the second electrode ELT2 may correspond to a rate of a coupling capacitance $C_{cap}$ between the second electrode ELT2 and the sensor gate line SGL with respect to the finger capacitance $C_{fig}$. For example, when the finger capacitance $C_{fig}$ is not formed, that is, when no touch occurs, the second electrode ELT2 may have a voltage at the same level as a voltage applied to the sensor gate line SGL. However, when the finger capacitance $C_{fig}$ is formed, for example, when the finger capacitance $C_{fig}$ is the same as the coupling capacitance $C_{cap}$, the second electrode ELT2 may have a voltage at a level corresponding to about half of the voltage applied to the sensor gate line SGL. When the sensing transistor SENT is turned on, the sensing transistor SENT may generate the sensing current $I_{sen}$ as a current amount corresponding to the ratio of the coupling capacitance $C_{cap}$ with respect to the finger capacitance $C_{fig}$.

After a sensing operation of a touch is performed in response to activation of the sensor gate line SGL, the second electrode ELT2 is reset in response to deactivation of the sensor gate line SGL and activation of the display gate line DGL. For example, the reset transistor REST may reset the second electrode ELT2 with a common voltage.

Subsequently, referring to FIG. 5, the other end of the sensing transistor SENT may be connected to the sensor gate line SGL together with the other end of the reset transistor REST. In this way, as the other end of the sensing transistor SENT is shared with another transistor, a parasitic capacitance that may occur according to a change of the finger capacitance $C_{fig}$ may be reduced.

Figure 6:
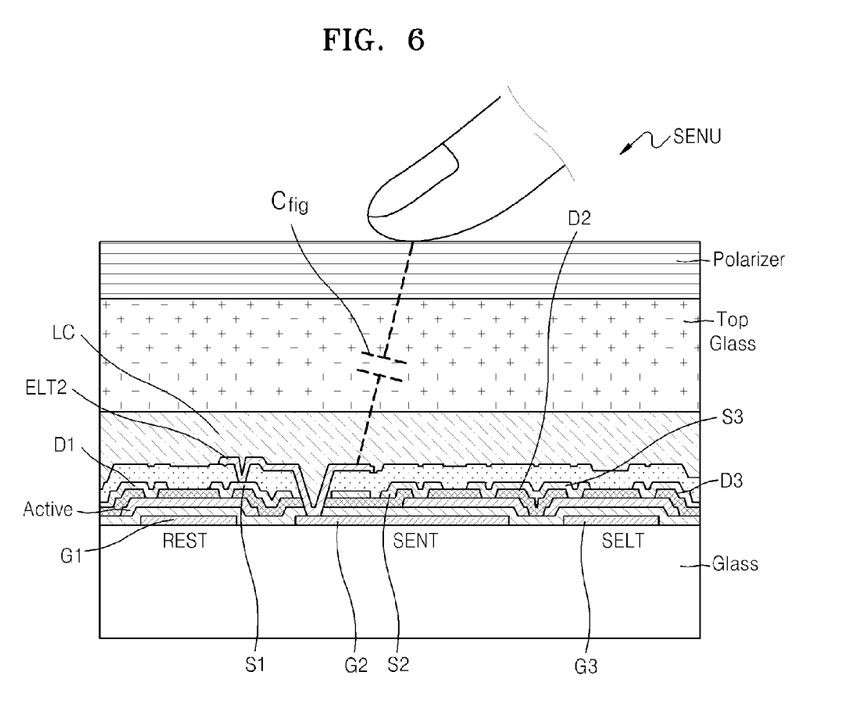
FIG. 6 is a cross-sectional view of the sensing unit illustrated in FIG. 5, according to at least one example embodiment.

FIG. 6 is a cross-sectional view of the sensing unit SENU illustrated in FIG. 5, according to at least one example embodiment.

Referring to FIGS. 5 and 6, gates G1, G2, and G3 of the reset transistor REST, the sensing transistor SENT, and the selection transistor SELT are formed on glass, and an active region Active is formed to be insulated from each of the gates G1, G2, and G3 by an insulator. The active region Active may be electrically connected to source and drain electrodes S1 and D1 and the like. An end S1 of the reset transistor REST is connected to the second electrode ELT2. A gate G2 of the sensing transistor SENT is connected to the second electrode ELT2, and an end D2 of the sensing transistor SENT is connected to an end S3 of the selection transistor SELT. Although not shown in FIG. 6, the gate G1 and the other end D1 of the reset transistor REST, the other end S1 of the sensing transistor SENT, and the gate G3 and the other end D3 of the selection transistor SELT may be connected to the gate line $GLIN_n$ or $GLIN_{n+1}$, or the sensing line SLIN illustrated in FIG. 3 via a contact (not shown).

As described previously, the coupling capacitance $C_{cap}$ may be formed by the second electrode ELT2 and the source and drain electrodes S1 and D1, and a physical touch may be sensed if the finger capacitance $C_{fig}$ is generated.

Figure 7:
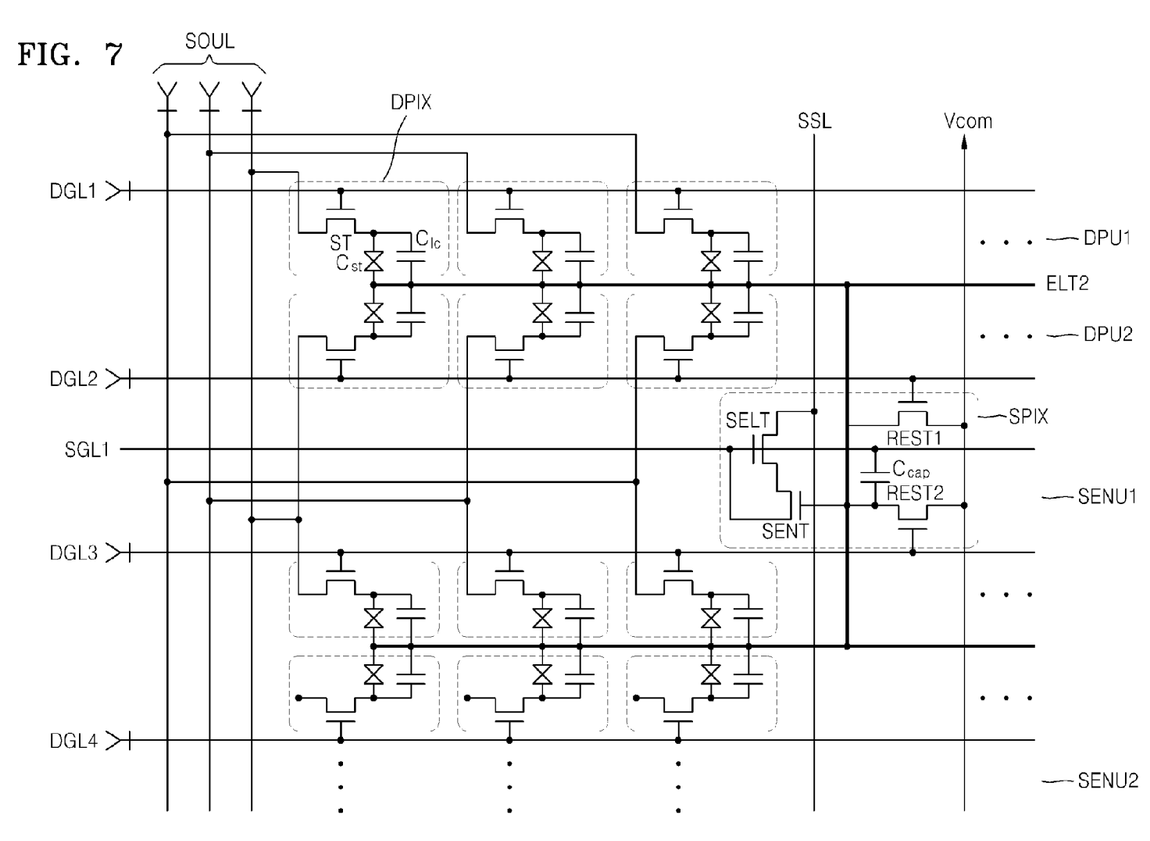
FIGS. 7 and 8 illustrate a structure and an operation of the touch panel of FIG. 1, respectively, according to at least one example embodiment.
Figure 8:
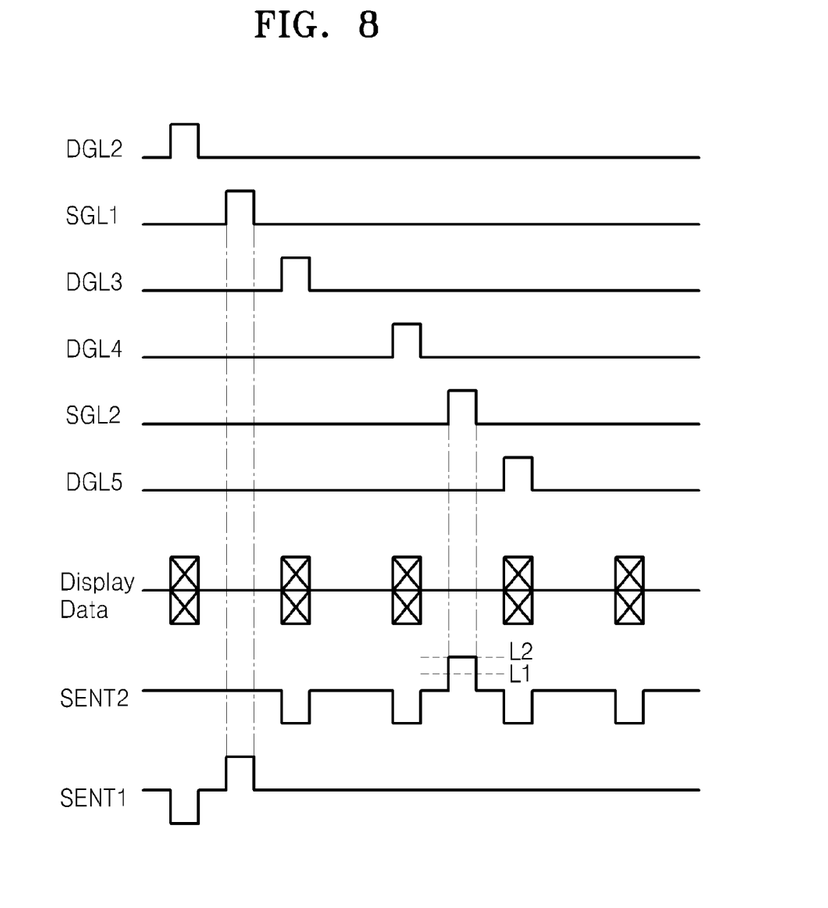

FIGS. 7 and 8 illustrate a structure and an operation of the touch panel TP of FIG. 1, according to at least one example embodiment.

Referring to FIGS. 1, 7, and 8, the sensing unit SENU of the touch panel TP may be provided in each of two display units DPU1 and DPU2 that share the second electrode ELT2. Although FIG. 7 illustrates only part of a display pixel DPIX of each of the display units DPU1 and DPU2, additional display pixels may be included in each of the display units DPU1 and DPU2.

The display unit DPU is activated by the display gate line DGL, as described previously, and applies the image voltage $V_{img}$ corresponding to the image data IDTA transmitted via a source line SOUL to the first electrode ELT1. The source line SOUL may be disposed in units of three lines R, G, and B. Although not shown in FIG. 7, the first electrode ELT1 may be connected to a drain of a switching transistor ST of the display unit DPU. A voltage difference $V_{diff}$ between the first electrode ELT1 and the second electrode ELT2 causes a variation of a cell capacitance $C_{ic}$ so that the liquid crystal is driven in response to the image voltage $V_{img}$. When the second electrode ELT2 is a common electrode, a common voltage $V_{com}$ is applied to the second electrode ELT2. A storage capacitor $C_{st}$ of the display unit DPU charged in response to the image voltage $V_{img}$.

A first display gate line DGL1 and a second display gate line DGL2 are sequentially activated, and the first display unit DPU1 and the second display unit DPU2 drive the liquid crystal sequentially so that a first sensor gate line SGL1 is activated. As the sensor gate line SGL is activated, the display gate line DGL is deactivated, and the first electrode ELT1 is floated. The liquid crystal may be maintained in a state (e.g., a voltage of the storage capacitor $C_{st}$ of the second display unit DPU2) to be driven by the second display unit DPU2 until the next display gate line (third display gate line DGL3) is activated.

When the first sensor gate line SGL1 is activated, as described above, the voltage variation $V_{var}$ of the second electrode ELT2 caused by the generated finger capacitance $C_{fig}$ is sensed with the sensing current $I_{sen}$. Although FIG. 7 illustrates only part of a sensing pixel SPIX of a first sensing unit SENU1, additional sensing pixels may be included in the first sensing unit SENU1.

In FIG. 8, a gate voltage of the sensing transistor SENT of a second sensing unit SENU2 may have a first level L1 when the finger capacitance $C_{fig}$ is formed, and the gate voltage of the sensing transistor SENT of the second sensing unit SENU2 may have a second level L2 when the finger capacitance $C_{fig}$ is not formed.

Each of the first reset transistor REST1 and the second reset transistor REST2 of the first sensing unit SENU1 resets the second electrode ELT2 before and after the sensing operation of the first sensing unit SENU1 is performed. For example, each of the first reset transistor REST1 and the second reset transistor REST2 may reset the second electrode ELT2 with a common voltage Vcom.

After the first sensor gate line SGL is deactivated, a third display gate line DGL3 is activated, and the above-described display and sensing operations are repeatedly performed. In FIG. 7, the second sensing unit SENU2 is not shown for convenience.

FIGS. 7 and 8 illustrate an example in which one sensing unit is disposed in each of two display units. However, the number of display units that share one sensing unit is not limited. The number of display units that share one sensing unit may vary according to a required touch sensitivity and the size of a display pixel. For example, when the size of the display pixel is small or a high touch sensitivity is required, the number of display units that share one sensing unit may be larger than that in FIG. 7.

Figure 9:
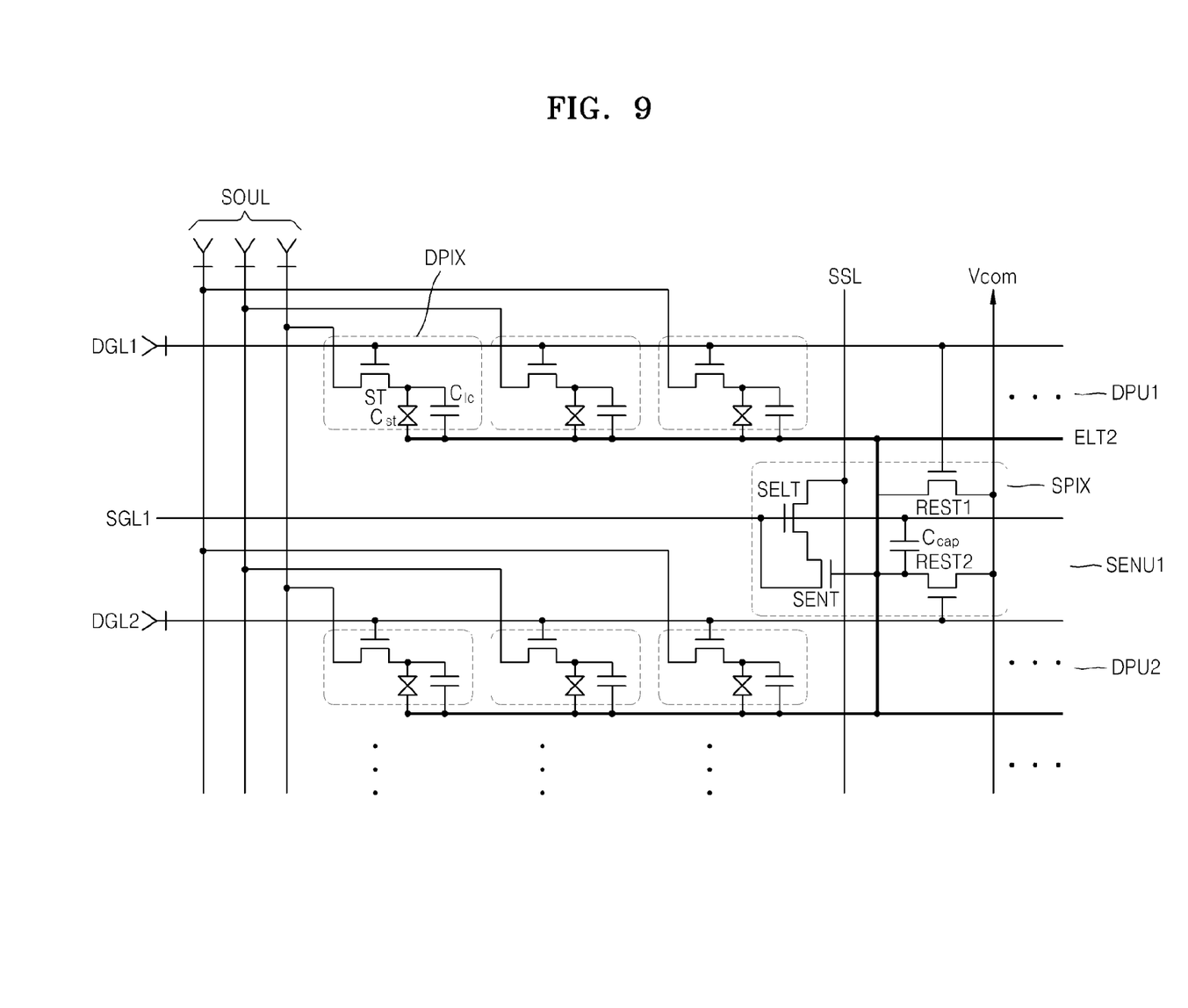
FIGS. 9 and 10 illustrate a structure and an operation of the touch panel of FIG. 1, respectively, according to at least one example embodiment.
Figure 10:
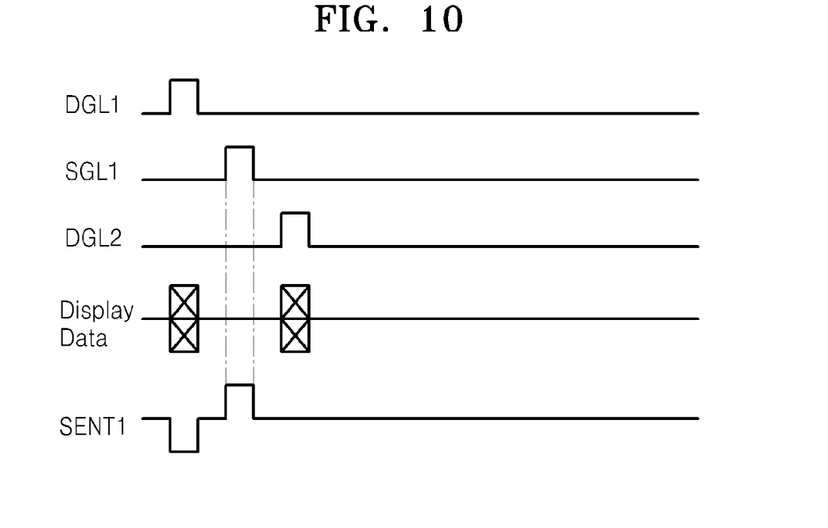

In addition, the sensing unit may not be shared by two or more display units. FIGS. 9 and 10 illustrate a structure and an operation of the touch panel TP of FIG. 1, according to at least one example embodiment. As illustrated in FIGS. 9 and 10, a sensing unit may be disposed in each display unit. When a sensing unit is disposed in each display unit, the sensing unit may be set according to a required touch sensitivity and the size of the display pixel.

Figure 11:
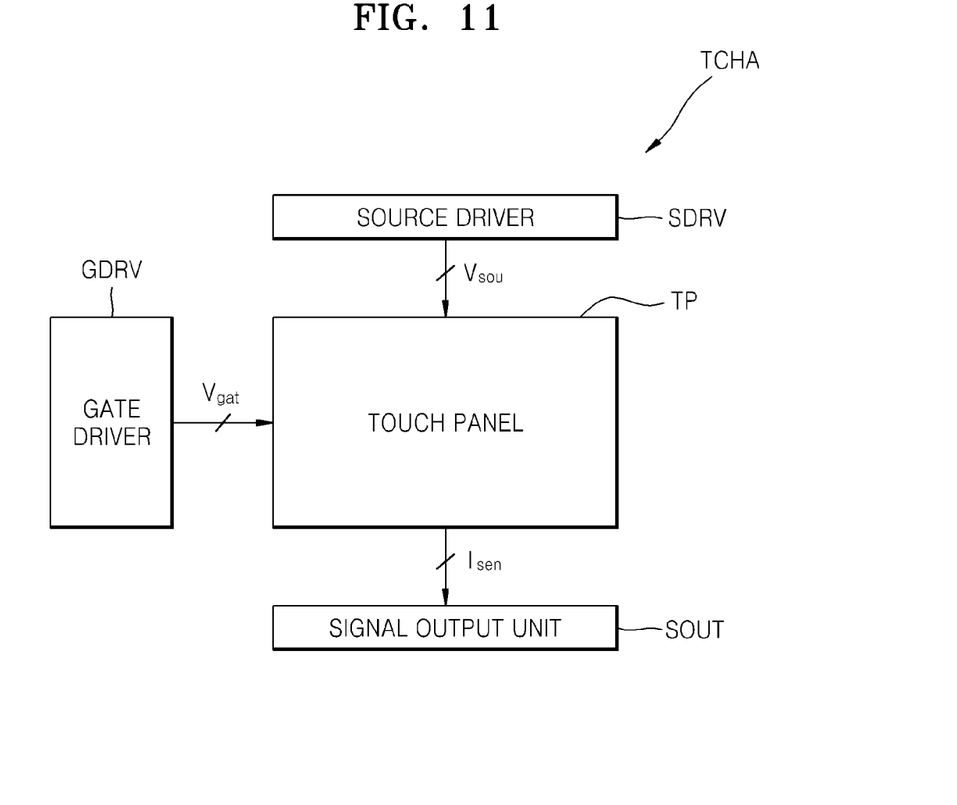
FIG. 11 illustrates a touch screen apparatus according to at least one example embodiment.

FIG. 11 illustrates a touch screen apparatus THCA according to at least one example embodiment.

Referring to FIG. 11, the touch screen apparatus THCA may include a gate driver GDRV and a source driver SDRV that respectively apply a gate voltage $V_{gat}$ and a source voltage $V_{sou}$ to the touch panel TP illustrated in FIG. 1, and a signal output unit SOUT that outputs a signal (data) corresponding to a received sensing value $I_{sen}$ sensed by the touch panel TP.

Figure 12:
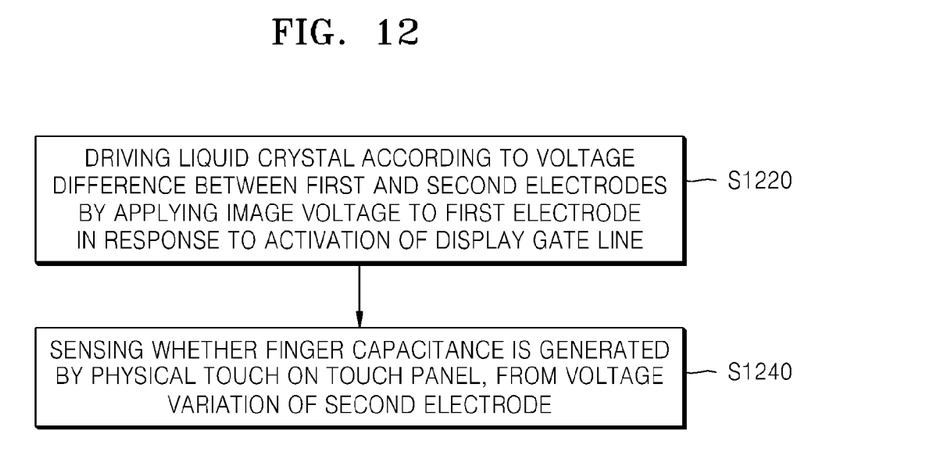
FIG. 12 is a flowchart illustrating a method of driving a touch panel, according to at least one example embodiment.

FIG. 12 is a flowchart illustrating a method of driving a touch panel, according to at least one example embodiment.

Referring to FIG. 12, the method of driving a touch panel includes driving a liquid crystal according to a voltage difference between first and second electrodes by applying an image voltage to the first electrode in response to activation of a display gate line (S1220) and sensing from a voltage variation of the second electrode (S1240) whether a finger capacitance is generated by physical touch on the touch panel. The method may further include resetting the second electrode before and after the sensing operation (S1240) is performed. The second electrode may be a common electrode, as described above.

Exemplary embodiments have been described above. However, it will be understood by one of ordinary skill in the art that modifications that do not depart from the spirit and technical scope of the example embodiments are encompassed by this application.

For example, in FIG. 7, the first sensing unit SENU1 may further include a second reset transistor REST2 together with a first reset transistor REST1 that resets the second electrode ELT2 before the sensing operation is performed, so that the second reset transistor REST2 may sense the second electrode ELT2 when a display gate line is activated after the sensing operation is performed. However, example embodiments are not limited thereto.

Figure 13:
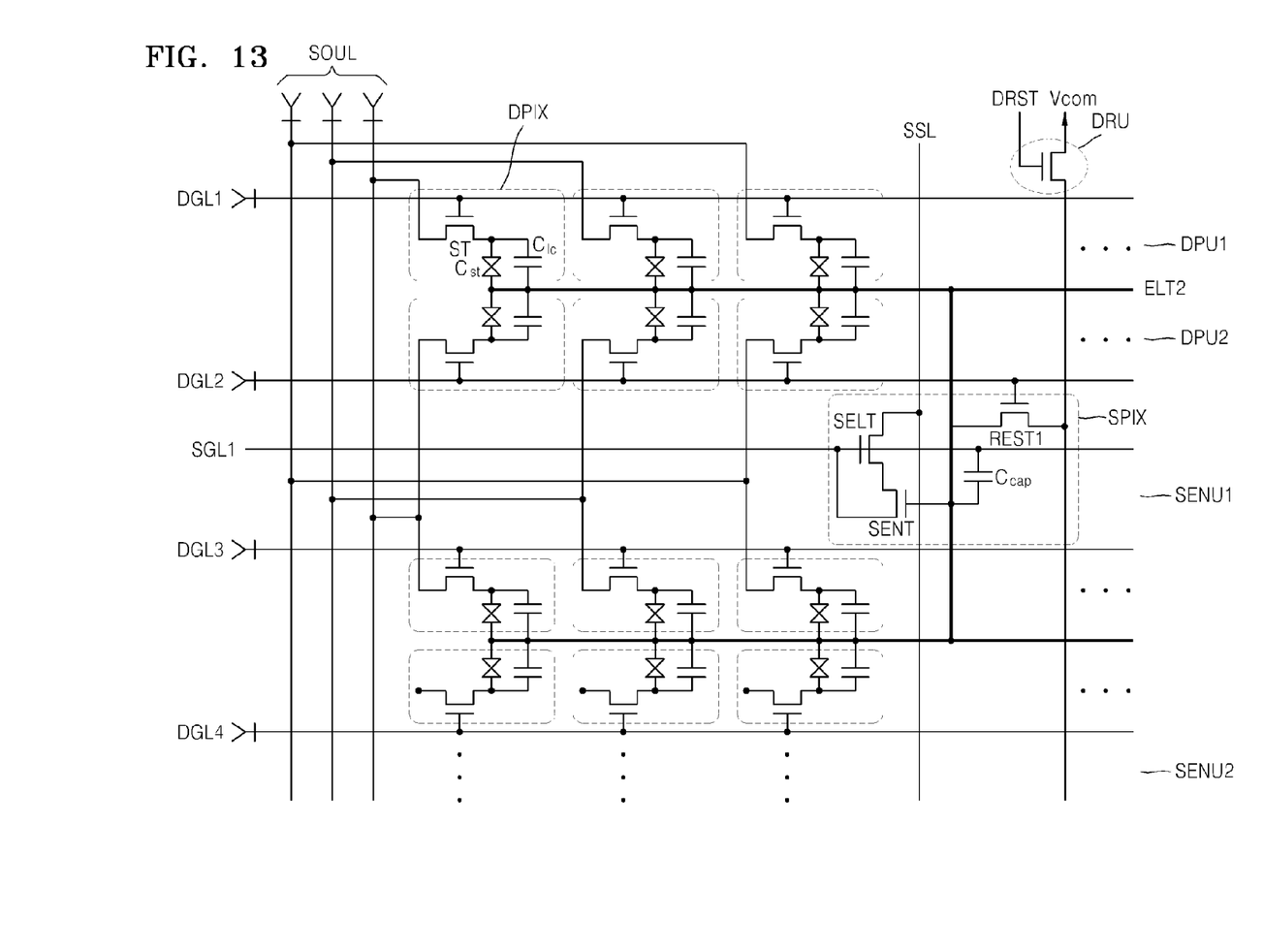
FIGS. 13 and 14 illustrate a structure and an operation of the touch panel of FIG. 1, respectively, according to at least one example embodiment.
Figure 14:
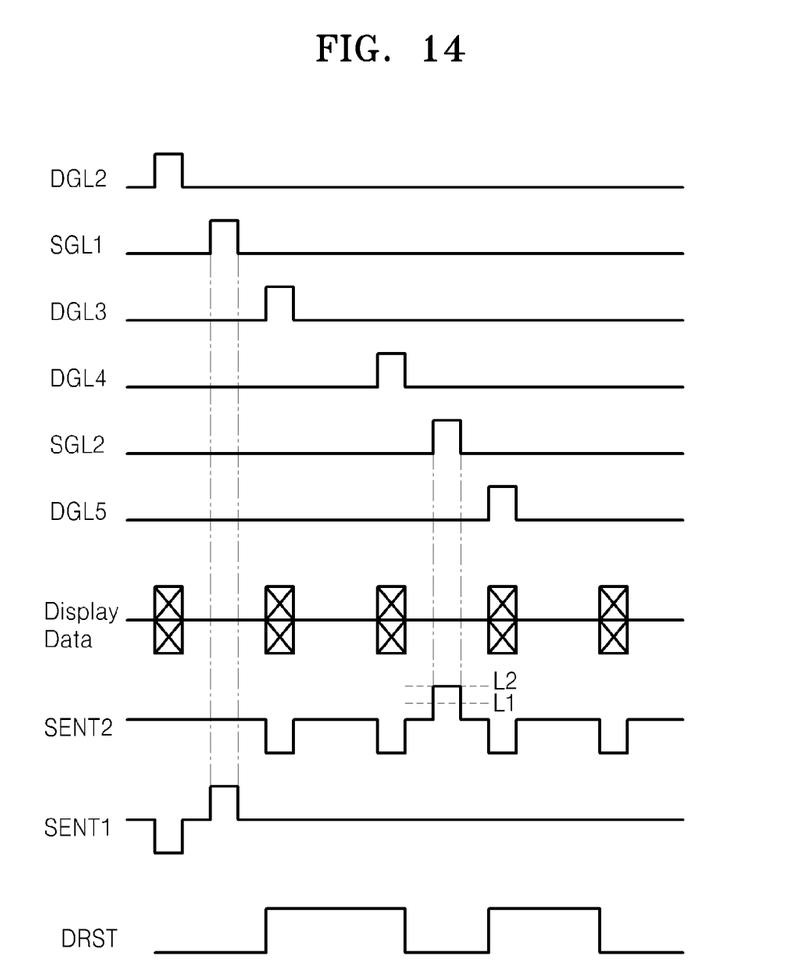

FIGS. 13 and 14 illustrate a structure and an operation of the touch panel TP of FIG. 1, according to at least one example embodiment. Referring to FIGS. 13 and 14, each of sensing units SENU1 and SENU2 of the touch panel TP may include only a first reset transistor REST1 and may also include a display resetting unit DRU. The display resetting unit DSU may reset the second electrode ELT2 when a display gate line is activated after each of the sensing units SENU1 and SENU2 performs a sensing operation, in response to a display reset signal DRST. The display reset signal DRST may be transmitted to the display resetting unit DSU by a control logic (not shown) that may be disposed on the touch screen apparatus THCA of FIG. 11.

As described above, in a touch panel, a touch screen apparatus, and a method of adaptively driving the touch panel according to one or more example embodiments, a particular electrode is used as a sensing electrode without disposing an additional sensing electrode on an in-cell type touch panel so that a reduction in aperture ratio may be mitigated (or alternatively, minimized) and sensing accuracy can be improved.

It should be understood that the exemplary embodiments described therein should be considered in a descriptive sense only and not for purposes of limitation. Descriptions of features or aspects within each example embodiment should typically be considered as available for other similar features or aspects in other embodiments.

What is claimed is:

1. A touch panel configured to drive a liquid crystal according to a voltage difference between first and second electrodes, the touch panel comprising:
    at least one display unit configured to,
        generate an image voltage and apply the image voltage to the first electrode, the image voltage corresponding to image data to be displayed in response to activation of a display gate line, and
    at least one sensing unit configured to sense, in response to activation of a sensor gate line, a voltage variation of the second electrode to determine whether a finger capacitance is generated by a physical touch on the touch panel,
    wherein, while the sensor gate line is activated, the first electrode floats so that the voltage difference between the first and second electrodes used in driving the liquid crystal is maintained.

2. The touch panel of claim 1, wherein the first electrode is a pixel electrode, and the second electrode is a common electrode.

3. The touch panel of claim 2, wherein the at least one display unit is a plurality of display units, and the second electrode is shared by a pair of display units from among the plurality of display units.

4. The touch panel of claim 1, wherein the at least one display unit is a plurality of display units and the at least one sensing unit is a plurality of sensing units, and each of the sensing units is disposed in a corresponding one of the display units.

5. The touch panel of claim 1, wherein the first and second electrodes are substantially parallel to an orientation of a director axis of the liquid crystal.

6. The touch panel of claim 1, wherein the voltage variation of the second electrode corresponds to a ratio of a coupling capacitance between the second electrode and the sensor gate line with respect to the finger capacitance.

7. The touch panel of claim 1, wherein the at least one display unit and the at least one sensing unit are formed on a same array.

8. The touch panel of claim 1, wherein the at least one sensing unit comprises:
    a sensing transistor configured to generate a sensing current corresponding to the voltage variation of the second electrode, the sensing transistor having a gate connected to the second electrode;
    a selection transistor configured to supply the sensing current of the sensing transistor to a sensing line if the sensor gate line is activated, the selection transistor having an end connected to an end of the sensing transistor and a gate connected to the sensor gate line; and
    at least one reset transistor configured to reset the second electrode if the display gate line is activated and the sensor gate line is deactivated, the reset transistor having a gate connected to the display gate line, an end connected to the second electrode, and an other end connected to the sensor gate line.

9. The touch panel of claim 8, wherein the sensing current of the sensing transistor corresponds to a ratio of a coupling capacitance between the first electrode and the sensor gate line with respect to the finger capacitance.

10. The touch panel of claim 8, wherein an other end of the sensing transistor is connected to the sensor gate line.

11. The touch panel of claim 9, wherein the at least one display unit is a plurality of display units, and the at least one sensing unit is disposed between two adjacent display units from among the plurality of display units.

12. The touch panel of claim 11, wherein the at least one reset transistor includes a first reset transistor having a gate connected to a display gate line of one of the two adjacent display units, and a second reset transistor having a gate connected to a display gate line of the other of the two adjacent display units.

13. The touch panel of claim 1, further comprising:
a display resetting unit configured to reset the second electrode if the display gate line is activated after the at least one sensing unit performs sensing.

14. A touch screen apparatus comprising:
a touch panel configured to drive a liquid crystal according to a voltage difference between first and second electrodes, the touch panel including,
  a display unit configured to generate an image voltage and apply the image voltage to the first electrode, the image voltage corresponding to image data to be displayed in response to activation of a display gate line, and
  a sensing unit configured to sense, in response to activation of a sensor gate line, a voltage variation of the second electrode to determine whether a finger capacitance is generated by a physical touch on the touch panel;
a gate driver configured to apply a gate voltage to the display gate line and the sensor gate line of the touch panel; and
a signal output unit configured to output a signal corresponding to a received sensing value of the sensing unit of the touch panel,
  wherein, while the sensor gate line is activated, the first electrode floats so that the voltage difference between the first and second electrodes used in driving the liquid crystal is maintained.

15. The touch screen apparatus of claim 14, wherein the first electrode is a pixel electrode, and the second electrode is a common electrode.

16. The touch screen apparatus of claim 14, wherein the first and second electrodes are substantially parallel to an orientation of a director axis of the liquid crystal.

17. The touch screen apparatus of claim 14, wherein the sensing unit comprises:
a sensing transistor configured to generate a sensing current corresponding to the voltage variation of the second electrode, the sensing transistor having a gate connected to the second electrode;
a selection transistor configured to supply the sensing current of the sensing transistor to a sensing line if the sensor gate line is activated, the selection transistor having an end connected to an end of the sensing transistor and a gate connected to the sensor gate line; and
a reset transistor configured to reset the second electrode if the display gate line is activated and the sensor gate line is deactivated, the reset transistor having a gate connected to the display gate line, an end connected to the second electrode, and an other end connected to the sensor gate line.

18. A method of driving a touch panel whereby a liquid crystal is driven according to a voltage difference between first and second electrodes, the method comprising:
generating an image voltage to be displayed in response to activation of a first display gate line;
applying the image voltage to the first electrode; and
sensing, in response to activation of a sensor gate line, a voltage variation of the second electrode to determine whether a finger capacitance is generated by a physical touch on the touch panel,
  wherein, while the sensor gate line is activated, the first electrode floats so that the voltage difference between the first and second electrodes used in driving the liquid crystal is maintained.

19. The method of claim 18, after the sensing, further comprising:
resetting the second electrode in response to activation of a second display gate line.

* * * * *